(12) United States Patent
Nakanishi et al.

(10) Patent No.: US 12,415,243 B2
(45) Date of Patent: Sep. 16, 2025

(54) PROCESSING MACHINE AND SLIDE MECHANISM

(71) Applicant: DMG MORI CO., LTD., Nara (JP)

(72) Inventors: Tatsuhiro Nakanishi, Nara (JP);
Futoshi Yamazaki, Nara (JP);
Tatsuhiko Kuriya, Nara (JP)

(*) Notice: Subject to any disclaimer, the term of this patent is extended or adjusted under 35 U.S.C. 154(b) by 416 days.

(21) Appl. No.: 17/924,733

(22) PCT Filed: May 14, 2020

(86) PCT No.: PCT/JP2020/019223
§ 371 (c)(1),
(2) Date: Nov. 11, 2022

(87) PCT Pub. No.: WO2021/229738
PCT Pub. Date: Nov. 18, 2021

(65) Prior Publication Data
US 2023/0182252 A1 Jun. 15, 2023

(51) Int. Cl.
*B23Q 11/08* (2006.01)
*E05D 15/06* (2006.01)
(Continued)

(52) U.S. Cl.
CPC ...... *B23Q 11/0825* (2013.01); *B23Q 11/0891* (2013.01); *B23B 3/065* (2013.01);
(Continued)

(58) Field of Classification Search
CPC . B23Q 11/0825; B23Q 11/0891; B23Q 11/08; E05D 15/0621–15/0691; B23B 25/04; Y10T 409/30392; Y10S 29/056
(Continued)

(56) References Cited

U.S. PATENT DOCUMENTS

| 5,897,430 A * | 4/1999 | Haller ............... B23Q 11/0891 |
| | | 451/451 |
| 2005/0095074 A1 | 5/2005 | Hacker et al. |
| 2018/0065224 A1* | 3/2018 | Nakamura ......... B23Q 11/0825 |

FOREIGN PATENT DOCUMENTS

| DE | 3513944 A | 10/1986 |
| JP | H11-70440 A | 3/1999 |

(Continued)

OTHER PUBLICATIONS

Translation of Written Opinion for PCT/JP2020/019223, mailed Jul. 21, 2020, 5 pages.*

*Primary Examiner* — Erica E Cadugan
(74) *Attorney, Agent, or Firm* — IP Business Solutions, LLC.

(57) ABSTRACT

A processing machine comprises: a cover that is provided with an opening and defines a processing area; a first door that is slidable between a first position in which the opening is opened and a second position in which the opening is closed; a second door that is disposed to overlap with the first door inside the processing area and slidable between the first position and a third position that is opposite to the first position with respect to the second position and in which the second door cooperates with the first door to close the opening; and a rail member that includes a grooved portion and an abutment that engage with the first door and is provided at the second door to allow the second door to slide with respect to the first door. The grooved portion and the abutment are disposed outside the processing area.

9 Claims, 8 Drawing Sheets

(51) Int. Cl.
  *B23B 3/06* (2006.01)
  *B23B 11/00* (2006.01)
  *B23B 25/04* (2006.01)

(52) U.S. Cl.
  CPC .......... *B23B 25/04* (2013.01); *E05D 15/0621* (2013.01); *Y10S 29/056* (2013.01); *Y10T 29/5109* (2015.01); *Y10T 409/30392* (2015.01)

(58) Field of Classification Search
  USPC ........................................................ 409/134
  See application file for complete search history.

(56) References Cited

FOREIGN PATENT DOCUMENTS

| | | |
|---|---|---|
| JP | H11-247536 A | 9/1999 |
| JP | 2006205337 A | 8/2006 |
| JP | 2013-193197 A | 9/2013 |
| KR | 10-2017-0116740 A * | 10/2017 |

* cited by examiner

PROCESSING MACHINE AND SLIDE MECHANISM

TECHNICAL FIELD

The present invention relates to a processing machine and a slide mechanism.

BACKGROUND ART

For example, Japanese Patent Application Laying-Open No. 2013-193197 (PTL 1) discloses a machine tool comprising an opening/closing door. The opening/closing door is supported by a guide rail and a door roller that slides on the guide rail to be laterally slidable.

CITATION LIST

Patent Literature

[PTL 1] Japanese Patent Laying-Open No. 2013-193197

SUMMARY OF INVENTION

Technical Problem

As disclosed in PTL 1 above, a known processing machine comprises a door slidably supported by a rail member. In such a processing machine, depending on the layout of the rail member, the rail member may be exposed to foreign matters such as chips or cutting oil as a workpiece is processed in a processing area. In that case, it is difficult to smoothly slide the door.

In the machine tool disclosed in PTL 1, the guide rail is provided on a frame (or base member) of the machine that supports the opening/closing door slidably. In that case, problems may arise such as a need to ensure a space for providing the base member with an elongate guide rail.

Accordingly, it is an object of the present invention to solve the above problem and provide a processing machine allowing a door to smoothly slide. Another object of the present invention is to provide a slide mechanism that can solve problems caused by providing a rail member to a base member that supports a movable body slidably.

Solution to Problem

According to the present invention, a processing machine comprises: a cover body that is provided with an opening and defines a processing area; a first door that is slidable in a predetermined direction between a first position in which the opening is opened and a second position in which the opening is closed; a second door that is disposed to overlap with the first door inside the processing area and slidable in the predetermined direction between the first position in which the opening is opened and a third position that is opposite to the first position with respect to the second position and in which the second door cooperates with the first door to close the opening; and a rail member that includes an engagement unit that engages with the first door and is provided at the second door to allow the second door to slide with respect to the first door in the predetermined direction. The engagement unit is disposed outside the processing area.

According to the thus configured processing machine, the engagement unit of the rail member that engages with the first door is disposed outside the processing area and can thus be prevented from being exposed to foreign matters such as chips or cutting oil as a workpiece is processed in the processing area. Thus, the engagement unit is kept clean, and the second door can smoothly be slid with respect to the first door.

Preferably, the second door includes an outer surface that faces the first door when the first door and the second door are in the first position. The rail member is provided at the second door without projecting from the outer surface toward the first door.

According to the thus configured processing machine, the first door and the second door can be provided closer to each other, and the processing area can be enhanced in sealability.

Preferably, the engagement unit includes an open end that is located opposite to the first door when the first door is in the second position and the second door is in the third position and that opens in one direction along the predetermined direction. The second door further includes a door body portion provided with the rail member, and a lid member that is attached to the door body portion and closes an opening defined by the open end.

According to the thus configured processing machine, the first door can be engaged with the engagement unit through the open end when the processing machine is assembled. Further, the lid member that is attached to the door body portion and closes the opening defined by the open end can prevent foreign matters such as chips or cutting oil from entering the engagement unit.

Preferably, the lid member includes a labyrinth portion that extends toward the first door and forms a labyrinth structure with the first door.

According to the thus configured processing machine, a number of parts can be reduced by providing the lid member that closes the opening defined by the open end with a labyrinth portion for providing a labyrinth structure integrally.

Preferably, the predetermined direction is a horizontal direction. The opening includes a front opening located in front, with respect to the machine, of the processing area, and an upper opening contiguous to the front opening and located above the processing area. The second door includes a front door portion and an upper door portion that close the front opening and the upper opening, respectively, when the second door is in the third position. Of the front and upper door portions, the front door portion is provided with the rail member.

According to the thus configured processing machine, the front door portion closes the front opening located in front, with respect to the machine, of the processing area, and foreign matters such as chips or cutting oil are likely to scatter toward the front door portion. Providing the rail member at the front door portion of the front and upper door portions can more effectively prevent the rail member from being exposed to foreign matters such as chips or cutting oil.

According to the present invention, a slide mechanism comprises: a base member; a movable body that is slidable in a predetermined direction; and a rail member that is provided at the movable body and engages with the base member so that the movable body is slidable in the predetermined direction with respect to the base member.

According to the thus configured slide mechanism, providing the rail member to the movable body can eliminate the necessity of providing the rail member to the base member. This can eliminate problems caused by providing the rail member to the base member.

Advantageous Effects of Invention

Thus, according to the present invention, a processing machine allowing a door to smoothly slide can be provided.

Further, according to the present invention, a slide mechanism that can solve problems caused by providing a rail member to a base member that supports a movable body slidably, can be provided.

DESCRIPTION OF EMBODIMENTS

Figure 1:
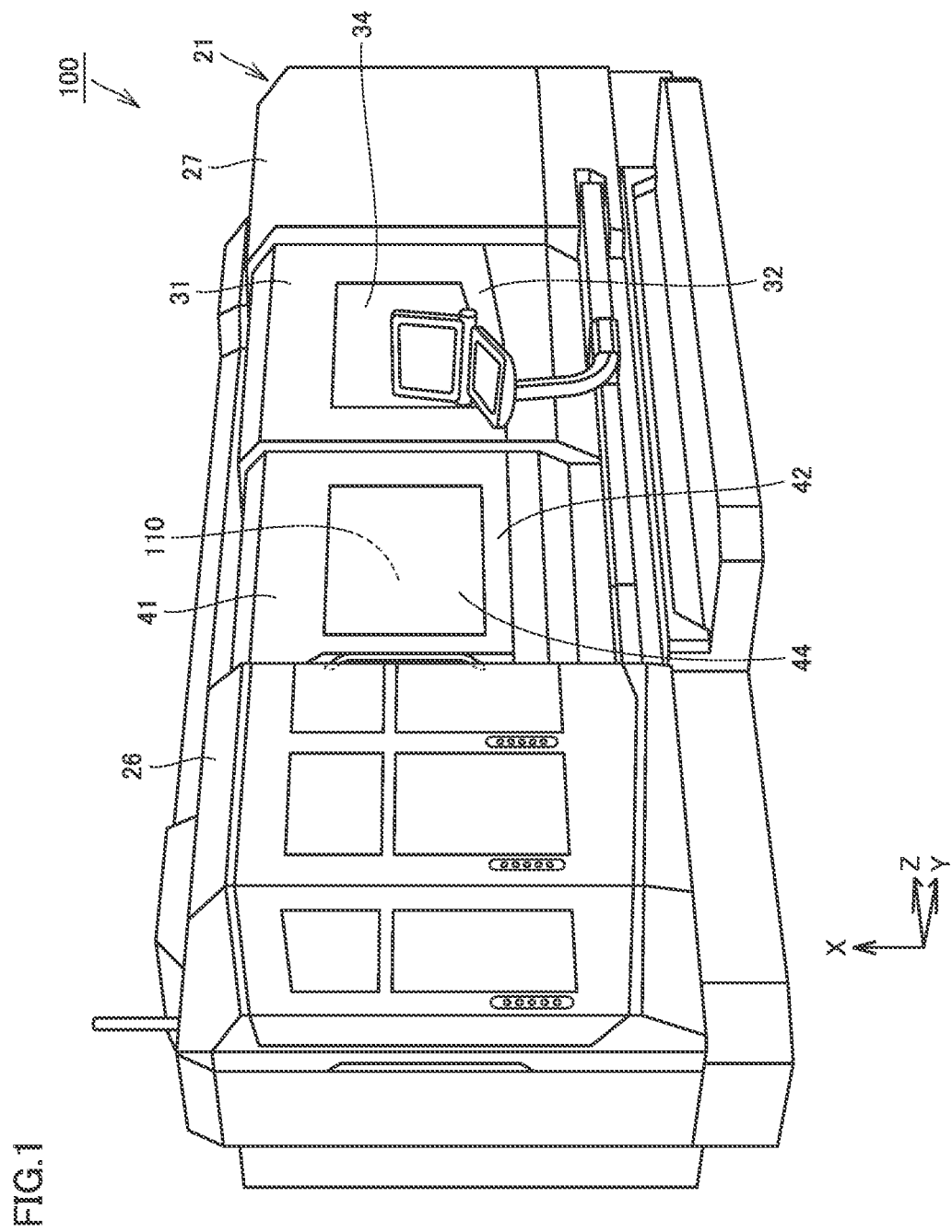
FIG. 1 is a perspective view of a processing machine according to an embodiment of the present invention.

An embodiment of the present invention will now be described with reference to the drawings. In the drawings referenced below, identical or equivalent members are identically denoted.

Figure 2:
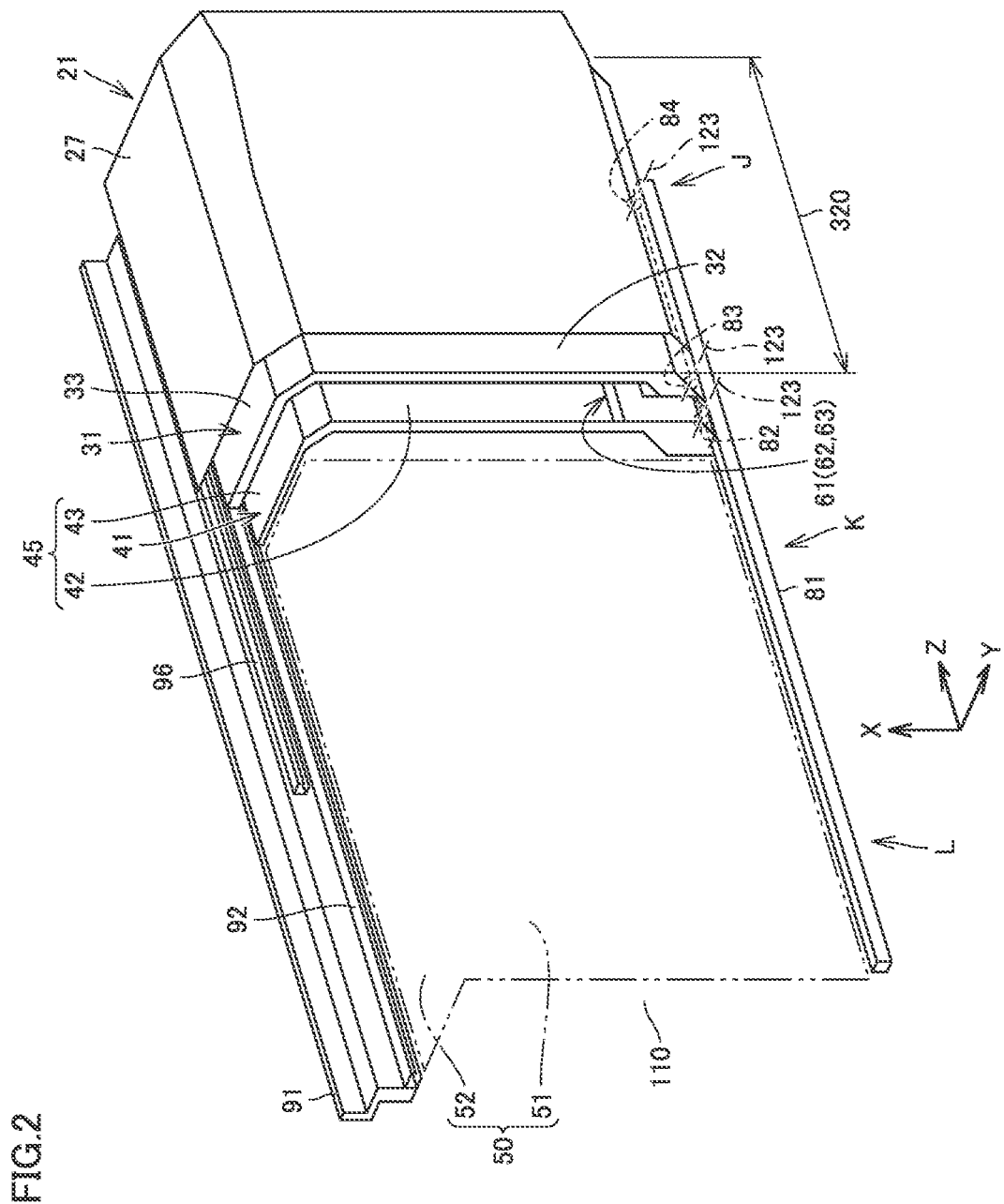
FIG. 2 is a perspective view of a first door and a second door in an open state in the processing machine shown in FIG. 1.
Figure 3:
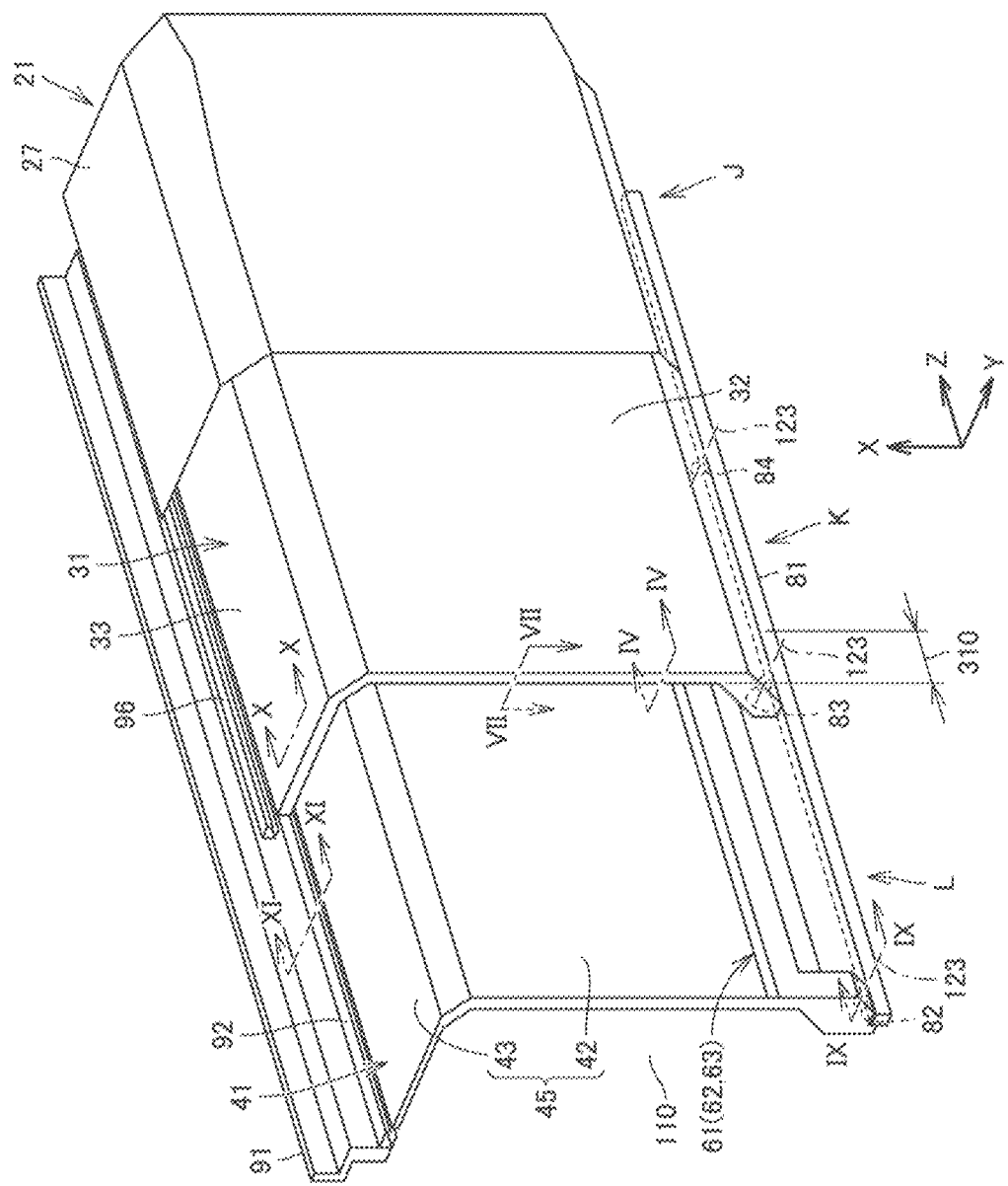
FIG. 3 is a perspective view of the first door and the second door in a closed state in the processing machine shown in FIG. 1.

FIG. 1 is a perspective view of a processing machine according to an embodiment of the present invention. FIG. 2 is a perspective view of a first door and a second door in an open state in the processing machine shown in FIG. 1. FIG. 3 is a perspective view of the first door and the second door in a closed state in the processing machine shown in FIG. 1.

Referring to FIGS. 1 to 3, a processing machine 100 is a numerically control (NC) processing machine in which a variety of types of operations for processing a workpiece are automated through numerical control by a computer. Processing machine 100 is a composite processing machine having a turning function using a fixed tool and a milling function using a rotating tool.

In the present specification, an axis parallel to a rightward/leftward direction (or widthwise direction) of processing machine 100 and extending in a horizontal direction is referred to as a "Z axis," an axis parallel to a frontward/rearward direction (or depthwise direction) of processing machine 100 and extending in a horizontal direction is referred to as a "Y axis," and an axis extending in a vertical direction is referred to as an "X axis." In FIG. 1, a rightward direction is referred to as a "+Z-axis direction" and a leftward direction is referred to as a "−Z-axis direction." In FIG. 1, a frontward direction with respect to the sheet of the figure is referred to as a "+Y-axis direction" and a rearward direction with respect thereto is referred to as a "−Y-axis direction." In FIG. 1, an upward direction is referred to as a "+X-axis direction," and a downward direction is referred to as a "−X-axis direction." The X-axis, the Y-axis, and the Z-axis are three axes orthogonal to one another.

Processing machine 100 includes a cover body 21. Cover body 21 defines a processing area 110 and configures an external appearance of processing machine 100. Processing area 110 is a space in which a workpiece is processed and which is generally sealed so as to prevent foreign matters such as chips or cutting oil from leaking outside processing area 110 as the workpiece is processed.

As shown in FIG. 2, cover body 21 is provided with an opening 50. Opening 50 defines an opening allowing processing area 110 to have an interior in communication with outside of processing area 110. An operator can access the interior of processing area 110 from outside processing area 110 through opening 50.

Opening 50 has a front opening 51 and an upper opening 52. Front opening 51 is located in front, with respect to the machine, of processing area 110 (or on a side of processing area 110 in the +Y-axis direction). Upper opening 52 is located above processing area 110 (or on a side thereof in the +X-axis direction). Upper opening 52 is contiguous to front opening 51.

Cover body 21 includes a first door 31, a second door 41, a side cover 27, and a magazine cover 26.

First door 31 and second door 41 are disposed in opening 50. First door 31 is slidable in a predetermined direction between a first position J in which opening 50 is opened and a second position K in which opening 50 is closed. Second door 41 is disposed to overlap with first door 31 inside processing area 110. Second door 41 is slidable in the predetermined direction between first position J in which opening 50 is opened and a third position L that is opposite to first position J with respect to second position K and in which second door 41 cooperates with first door 31 to close opening 50.

First door 31 and second door 41 are slidable independently of each other. First door 31 and second door 41 are slidable in the same direction. First door 31 and second door 41 are slidable in a horizontal direction. First door 31 and second door 41 are slidable in the Z-axis direction.

First door 31 and second door 41 may be manually slid doors or automatic doors slid by a cylinder or a motor or a similar actuator.

As shown in FIGS. 1 and 3, when first door 31 is in second position K and second door 41 is in third position L, opening 50 is closed. First door 31 is disposed at a position adjacent to second door 41 in the +Z-axis direction. First door 31 and second door 41 define and form processing area 110 with an intra-machine cover disposed in processing area 110 on right and left sides with respect to the machine, a telescopic cover disposed on a rear side in processing area 110 and deformable as a tool spindle (not shown) moves in the X- and Z-axis directions, a ceiling cover disposed above processing area 110, and the like.

First door 31 includes a front door portion 32 and an upper door portion 33. When first door 31 is in second position K, front door portion 32 closes front opening 51 shown in FIG. 2, and upper door portion 33 closes upper opening 52 shown in FIG. 2. Front door portion 32 is generally in the form of a plate parallel to the X-Z plane. Front door portion 32 is provided with a transparent window 34 (see FIG. 1). Upper door portion 33 is generally in the form of a plate parallel to the Y-Z plane. An upper end portion of front door portion 32 and a front end portion (an end portion in the +Y-axis direction) of upper door portion 33 are contiguous to form a corner portion.

Second door 41 includes a front door portion 42 and an upper door portion 43. When second door 41 is in third position L, front door portion 42 closes front opening 51 shown in FIG. 2, and upper door portion 43 closes upper opening 52 shown in FIG. 2. Front door portion 42 is generally in the form of a plate parallel to the X-Z plane. Front door portion 42 is provided with a transparent window 44 (see FIG. 1). Upper door portion 43 is generally in the form of a plate parallel to the Y-Z plane. An upper end portion of front door portion 42 and a front end portion (an end portion in the +Y-axis direction) of upper door portion 43 are contiguous to form a corner portion.

First door 31 in second position K and second door 41 in third position L overlap with each other in a first range 310 in the Z-axis direction.

More specifically, an end portion of second door 41 in the +Z-axis direction overlaps with an end portion of first door 31 in the −Z-axis direction inside processing area 110. An end portion of front door portion 42 of second door 41 in the +Z-axis direction and an end portion of front door portion 32 of first door 31 in the −Z-axis direction are opposite to each other in the Y-axis direction. An end portion of upper door portion 43 of second door 41 in the +Z-axis direction and an end portion of upper door portion 33 of first door 31 in the −Z-axis direction are opposite to each other in the X-axis direction.

As shown in FIGS. 1 to 3, side cover 27 and magazine cover 26 are provided on opposite sides, respectively, of opening 50 in the Z-axis direction. Side cover 27 is provided at a position adjacent in the +Z-axis direction to first door 31 in second position K. Inside side cover 27 is accommodated a spindle for rotating a workpiece, or a tail stock for supporting the center of rotation of the workpiece, etc. Magazine cover 26 is provided at a position adjacent in the −Z-axis direction to second door 41 in third position L. Inside magazine cover 26 are accommodated a magazine for storing a plurality of tools used to process a workpiece etc.

As shown in FIG. 2, when first door 31 and second door 41 are in first position J, opening 50 is in an open state. First door 31 and second door 41 are disposed inside side cover 27. Processing area 110 is opened to an outside of processing area 110 through opening 50 in the open state.

First door 31 in first position J and second door 41 in first position J overlap with each other in a second range 320 in the Z-axis direction. Second range 320 in the Z-axis direction is larger in length than first range 310 in the Z-axis direction shown in FIG. 3. The end portion of first door 31 in the −Z-axis direction is exposed from side cover 27. An end portion of second door 41 in the −Z-axis direction is exposed from first door 31.

Figure 4:
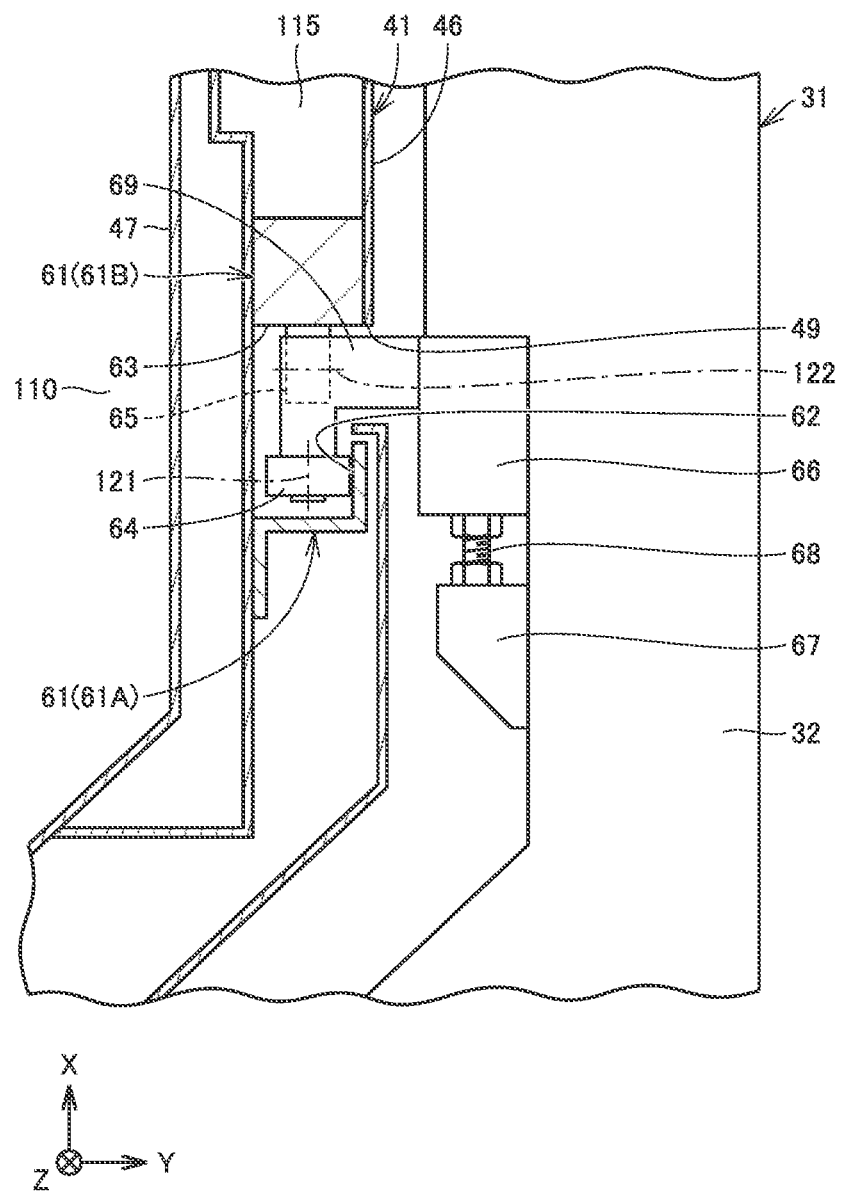
FIG. 4 is a cross section of the processing machine taken along and seen in a direction indicated by an arrow of a line IV-IV indicated in FIG. 3.

FIG. 4 is a cross section of the processing machine taken along and seen in a direction indicated by an arrow of a line Iv-Iv indicated in FIG. 3. Referring to FIGS. 3 and 4, second door 41 has an outer surface 46 and an inner surface 47. When second door 41 is in third position L, outer surface 46 is located outside processing area 110. Inner surface 47 is located inside processing area 110 rearwardly of outer surface 46.

Inner surface 47 faces the −Y-axis direction, and outer surface 46 faces the +Y-axis direction. When first door 31 and second door 41 are in first position J, outer surface 46 faces first door 31 in second range 320 shown in FIG. 2. When first door 31 is in second position K and second door 41 is in third position L, outer surface 46 faces first door 31 in first range 310 shown in FIG. 3.

Second door 41 includes a door body portion 45. When second door 41 is in second position K, door body portion 45 serves as a main portion of second door 41 closing opening 50. Door body portion 45 is composed of a front door portion 42 and an upper door portion 43.

Processing machine 100 further comprises a rail member 61. Rail member 61 is provided at second door 41. Rail member 61 is provided at door body portion 45. Rail member 61 is provided at front door portion 42. Of front door portion 42 and upper door portion 43, front door portion 42 is provided with rail member 61.

Rail member 61 has an elongate shape having a length in the Z-axis direction. Rail member 61 is provided at a position closer in the X-axis direction to the lower end of front door portion 42 than the upper end of front door portion 42.

Rail member 61 is provided at second door 41 without projecting from outer surface 46 toward first door 31. An internal space 115 is formed between inner surface 47 and outer surface 46. Rail member 61 is accommodated in internal space 115. Second door 41 has a notch 49 that opens to outer surface 46. Internal space 115 and processing area 110 are isolated from each other with inner surface 47 interposed therebetween. Internal space 115 is in communication with an outside of processing area 110 through notch 49.

Processing machine 100 comprises a plurality of rail members 61 (61A, 61B). A rail member 61A and a rail member 61B are disposed in internal space 115 and opposite to each other in a vertical direction. Rail member 61B is provided above rail member 61A. Rail member 61A is provided immediately below an opening formed by notch 49. Rail member 61B is provided immediately above the opening formed by notch 49.

Rail member 61A is formed of a plate bent along a plurality of straight lines extending in the Z-axis direction. Rail member 61B is composed of a block.

Rail member 61A has a grooved portion 62. Grooved portion 62 forms a groove extending in the Z-axis direction. Grooved portion 62 is open in the +X-axis direction (or upward). Rail member 61B has an abutment 63. Abutment 63 is in the form of a plane extending in the Z-axis direction. Abutment 63 is composed of a plane facing the −X-axis direction (or downward) and parallel to the Y-Z plane.

Grooved portion 62 and abutment 63 are disposed outside processing area 110. Grooved portion 62 and abutment 63 are disposed in internal space 115. Grooved portion 62 and abutment 63 are isolated from processing area 110 with inner surface 47 interposed therebetween. Grooved portion 62 and abutment 63 correspond to an "engagement unit" in the present invention.

Figure 5:
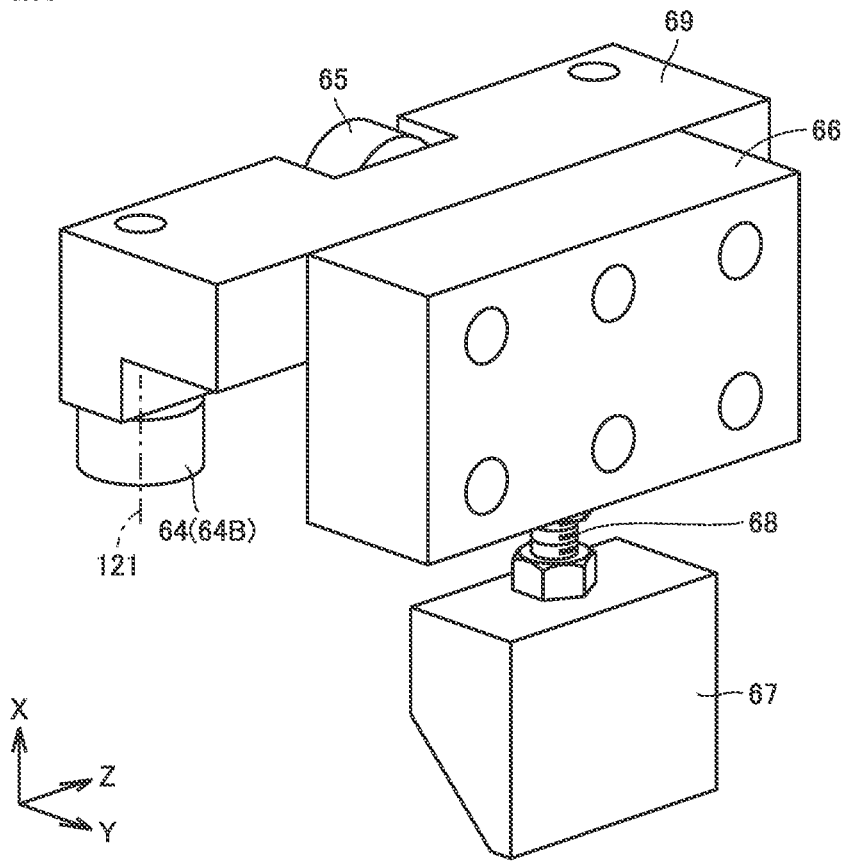
FIG. 5 is a perspective view of a traveling wheel provided at the first door shown in FIG. 4 and an attachment structure for the traveling wheel.
Figure 6:
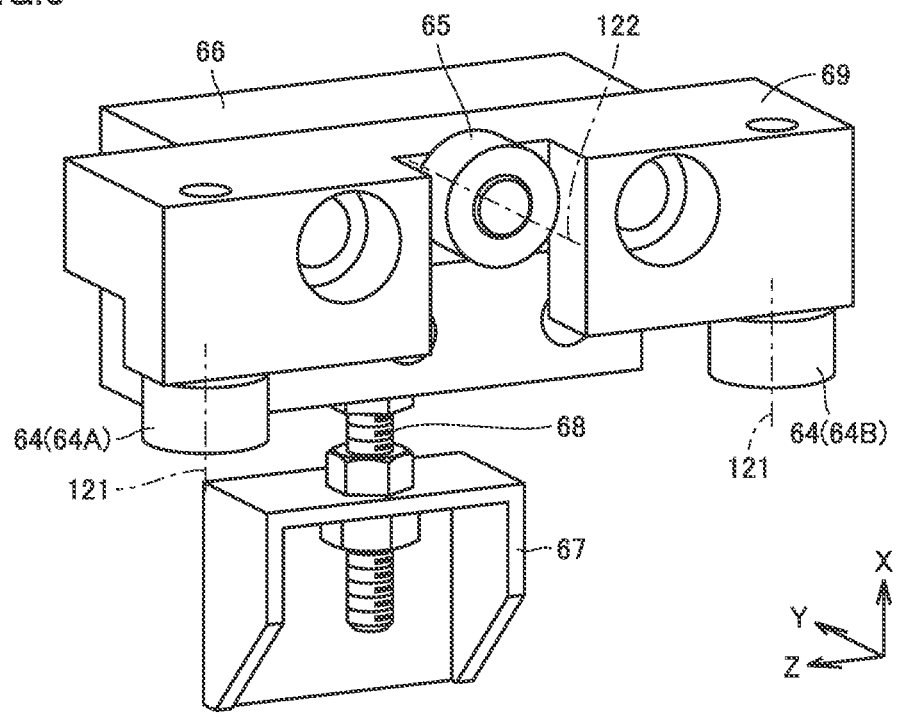
FIG. 6 is another perspective view of the traveling wheel provided at the first door shown in FIG. 4 and the attachment structure for the traveling wheel.

FIGS. 5 and 6 are perspective views of a traveling wheel provided at the first door shown in FIG. 4 and an attachment structure for the traveling wheel. Referring to FIGS. 4 to 6, processing machine 100 further comprises a first traveling wheel 64 (64A, 64B) and a second traveling wheel 65.

First and second traveling wheels 64 and 65 are provided at first door 31. First and second traveling wheels 64 and 65 are provided at front door portion 32.

First and second traveling wheels 64 and 65 are provided at positions closer to the lower end of front door portion 32 than the upper end of front door portion 32 in the X-axis direction. First and second traveling wheels 64 and 65 are provided in the Z-axis direction at positions closer to the end portion of first door 31 in the −Z-axis direction than an end portion of first door 31 in the +Z-axis direction. As shown in FIG. 3, when first door 31 is in second position K and second door 41 is in third position L, first and second traveling wheels 64 and 65 are located in first range 310. First and second traveling wheels 64 and 65 are each formed for example of a cam follower.

First traveling wheel 64 is provided rotatably about an axis of rotation 121 extending in the X-axis direction. First traveling wheels 64A and 64B are spaced from each other in the Z-axis direction.

Second traveling wheel 65 is provided rotatably about an axis of rotation 122 extending in the Y-axis direction. Second traveling wheel 65 is provided above first traveling wheel 64. Second traveling wheel 65 is provided between first traveling wheels 64A and 64B in the Z-axis direction.

Grooved portion 62 and abutment 63 engage with first door 31. Rail member 61 allows second door 41 to slide with respect to first door 31.

More specifically, first traveling wheel 64 is fitted in grooved portion 62. First traveling wheels 64A and 64B are fitted in grooved portion 62 at positions spaced from each other in the Z-axis direction. Fitting first traveling wheel 64 into grooved portion 62 restricts a positional relationship between first door 31 and second door 41 in the Y-axis direction. Second traveling wheel 65 is disposed under abutment 63. Second traveling wheel 65 abuts on abutment 63. Causing second traveling wheel 65 to abut on abutment 63 restricts a positional relationship between first door 31 and second door 41 in the X-axis direction.

Second door 41 is supported slidably in the Z-axis direction by first traveling wheel 64 (64A, 64B) moving along grooved portion 62 while rotating about axis of rotation 121, and second traveling wheel 65 moving along abutment 63 while rotating about axis of rotation 122.

Processing machine 100 further comprises a first block 66 and a second block 69. First and second traveling wheels 64 and 65 are attached to first door 31 (or front door portion 32) via first block 66 and second block 69.

First block 66 is attached to front door portion 32. First block 66 is opposite in the Y-axis direction to the opening formed by notch 49. Second block 69 is attached to first block 66. Second block 69 projects from first block 66 in the −Y-axis direction and enters internal space 115 through notch 49. First and second traveling wheels 64 and 65 are attached to second block 69.

Processing machine 100 further comprises a frame 67 and a bolt 68. Frame 67 is attached to front door portion 32. Frame 67 is provided below first block 66. Bolt 68 extends in the X-axis direction. An end portion of bolt 68 in the +X-axis direction is secured to first block 66. An end portion of bolt 68 in the −X-axis direction bolts frame 67.

This configuration can change a length of bolt 68 projecting from frame 67, and hence a position (or level) of first block 66 in the X-axis direction. Thus, first and second traveling wheels 64 and 65 can be positionally adjusted in the vertical direction.

According to this configuration, rail member 61 has grooved portion 62 and abutment 63 outside processing area 110. Therefore, as shown in FIG. 3, when first door 31 is in second position K and second door 41 is in third position L, and a workpiece is processed in processing area 110, grooved portion 62 and abutment 63 can be prevented from being exposed to foreign matters such as chips or cutting oil as the workpiece is processed. This allows first and second traveling wheels 64 and 65 to smoothly rotate along grooved portion 62 and abutment 63, respectively, and second door 41 to slide more reliably. In the present embodiment, in particular, rail member 61 configured to have grooved portion 62 and abutment 63 disposed outside processing area 110 is adopted at front door portion 42 at which foreign matters such as chips or cutting oil easily scatter. This more effectively allows second door 41 to slide more reliably.

Further, rail member 61 is provided without projecting from outer surface 46 of second door 41 toward first door 31. This configuration allows first door 31 and second door 41 to be provided closer to each other, and can enhance processing area 110 in sealability when first door 31 is in second position K and second door 41 is in third position L. This can more reliably prevent processing area 110 from leaking foreign matters such as chips or cutting oil.

Rail member 61 is provided at second door 41, which is a movable body slidable in the Z-axis direction. This configuration can reduce limitation in designing first door 31 as it is unnecessary to provide rail member 61 that is an elongate body to first door 31 that is a base member that supports second door 41 slidably.

Figure 7:
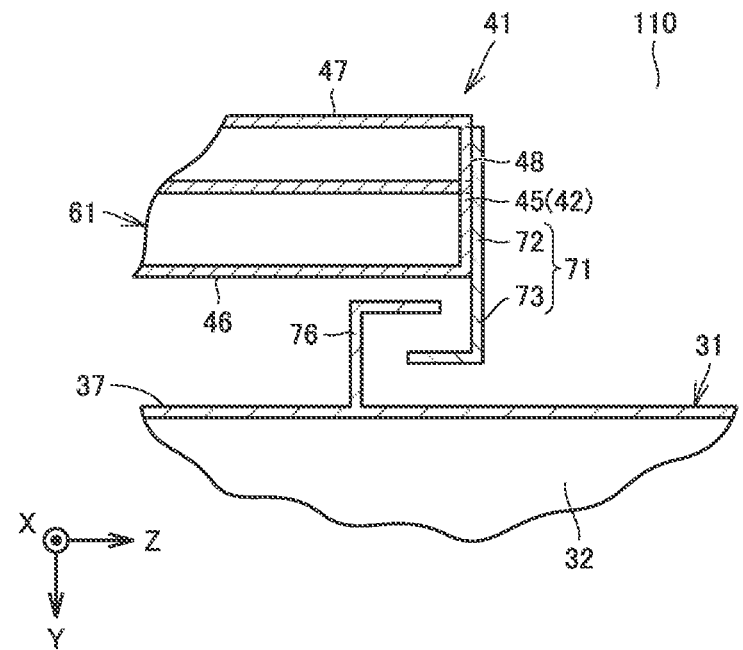
FIG. 7 is a cross section of the processing machine taken along and seen in a direction indicated by an arrow of a line VII-VII indicated in FIG. 3.
Figure 8:
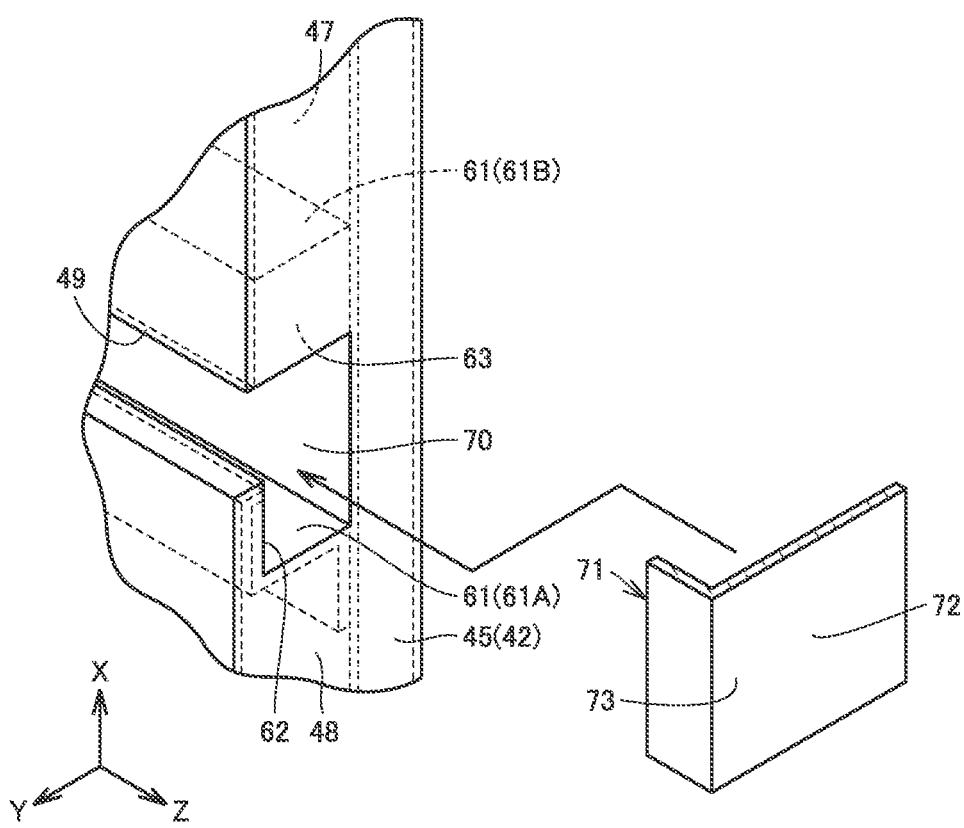
FIG. 8 is an exploded view of assembling the second door shown in FIG. 7.

FIG. 7 is a cross section of the processing machine taken along and seen in a direction indicated by an arrow of a line VII-VII indicated in FIG. 3. FIG. 8 is an exploded view of assembling the second door shown in FIG. 7.

Referring to FIGS. 7 and 8, door body portion 45 (or front door portion 42) further includes a side surface 48. Side surface 48 faces the +Z-axis direction. An end of side surface 48 in the −Y-axis direction is contiguous to inner surface 47, and an end of side surface 48 in the +Y-axis direction is contiguous to outer surface 46.

Grooved portion 62 and abutment 63 have an open end 70. When first door 31 is in second position K and second door 41 is in third position L, open end 70 is located at an end of first range 310 shown in FIG. 3. Open end 70 is opposite to first door 31 in the Y-axis direction. Open end 70 is open in one direction along the Z axis. Open end 70 is open in the +Z-axis direction. Open end 70 defines an opening in side surface 48.

Second door 41 further includes a lid member 71. Lid member 71 is attached to door body portion 45. Lid member 71 is detachably attachable to door body portion 45 with a bolt or the like. Lid member 71 is attached to front door portion 42. Lid member 71 is provided so as to close the opening defined by open end 70.

Lid member 71 includes a lid body portion 72 and a labyrinth portion 73. Lid body portion 72 is in the form of a plate parallel to the X-Y plane. Lid body portion 72 is brought to overlap with side surface 48 to close the opening defined by open end 70.

Labyrinth portion 73 extends from lid body portion 72 toward first door 31 and has the extension with a tip bent and thus projecting in the −Z-axis direction. Labyrinth portion 73 has a bent structure in which a plate material parallel to the X-Y plane and a plate material parallel to the X-Z plane form a corner.

First door 31 has an inner surface 37. Inner surface 37 faces outer surface 46 of second door 41. First door 31 includes a labyrinth member 76. Labyrinth member 76 extends from inner surface 37 toward second door 41 (or outer surface 46) and has the extension with a tip bent and thus projecting in the +Z-axis direction. When first door 31 is in second position K and second door 41 is in third position L, labyrinth portion 73 and labyrinth member 76 are opposite to each other with a gap therebetween in the Z-axis direction and the Y-axis direction to configure a labyrinth structure.

According to this configuration, when processing machine 100 (cover body 21) is assembled, first and second traveling wheels 64 and 65 can be inserted to grooved portion 62 and abutment 63, respectively, through open end 70. Further, attaching lid member 71 to lid body portion 72 and closing by lid body portion 72 the opening defined by open end 70 can prevent foreign matters such as chips or cutting oil from entering grooved portion 62 from processing area 110.

Further, labyrinth portion 73 forming a labyrinth structure with labyrinth member 76 of first door 31 is provided to lid member 71 in one piece. This allows processing machine 100 to be composed of a reduced number of parts and hence manufactured at a reduced cost.

Figure 9:
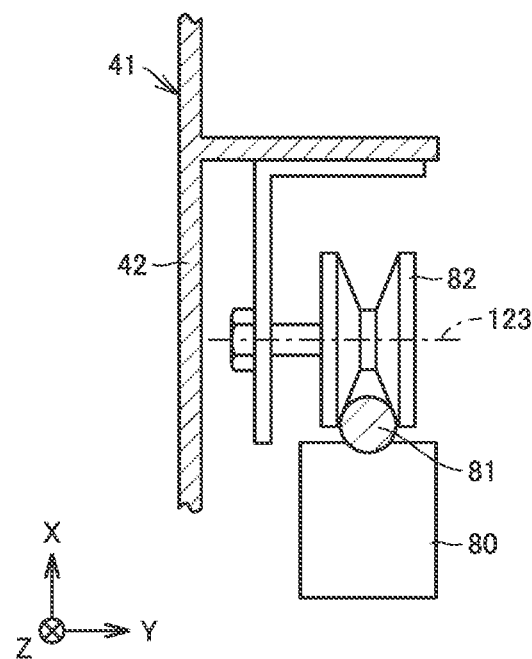
FIG. 9 is a cross section of the processing machine taken along and seen in a direction indicated by an arrow of a line IX-IX in FIG. 3.

FIG. 9 is a cross section of the processing machine taken along and seen in a direction indicated by an arrow of a line IX-IX indicated in FIG. 3. Referring to FIGS. 3 and 9, processing machine 100 further comprises a support member 80, a lower rail 81, and a plurality of traveling wheels 82, 83, 84.

Support member 80 is provided under first door 31 and second door 41. Support member 80 is fixed to an oil pan (not shown) in processing area 110. Lower rail 81 is supported by support member 80. Lower rail 81 extends in the Z-axis direction. Lower rail 81 extends in the Z-axis direction across first position J, second position K, and third position L.

Traveling wheel 82 is provided at second door 41. Traveling wheel 82 is provided at front door portion 42. Traveling wheel 82 is provided below rail member 61. Traveling wheel 82 is provided at a position closer in the Z-axis direction to the end portion of second door 41 in the −Z-axis direction than the end portion of second door 41 in the +Z-axis direction.

Traveling wheels 83 and 84 are provided at first door 31. Traveling wheels 83 and 84 are provided at front door portion 32. Traveling wheels 83 and 84 are provided below first and second traveling wheels 64 and 65. Traveling wheels 83 and 84 are provided apart from each other in the Z-axis direction. Traveling wheel 83 is provided at a position closer in the Z-axis direction to the end portion of first door 31 in the −Z-axis direction than the end portion of first door 31 in the +Z-axis direction. Traveling wheel 84 is provided at a position away from traveling wheel 83 in the +Z-axis direction. Traveling wheel 84 is provided at a position closer in the Z-axis direction to the end portion of first door 31 in the +Z-axis direction than the end portion of first door 31 in the −Z-axis direction.

Traveling wheels 82, 83, 84 are provided rotatably about an axis of rotation 123 parallel to the Y-axis direction. For example, traveling wheel 82, 83, 84 is a pulley formed to have a groove recessed radially inwards towards axis of rotation 123 and also extending circumferentially about axis of rotation 123.

Traveling wheels 82, 83, 84 are disposed on lower rail 81. Second door 41 is supported slidably in the Z-axis direction by traveling wheel 82 moving along lower rail 81 while rotating about axis of rotation 123. First door 31 is supported slidably in the Z-axis direction by traveling wheels 83 and 84 moving along lower rail 81 while rotating about axis of rotation 123.

First door 31 and second door 41 are supported from below by a single rail or lower rail 81. Traveling wheels 82, 83, and 84 are aligned in the Z-axis direction. Wherever first door 31 and second door 41 may be positioned, traveling wheel 82 is located at a position closer to the −Z-axis direction than traveling wheels 83 and 84 are.

Figure 10:
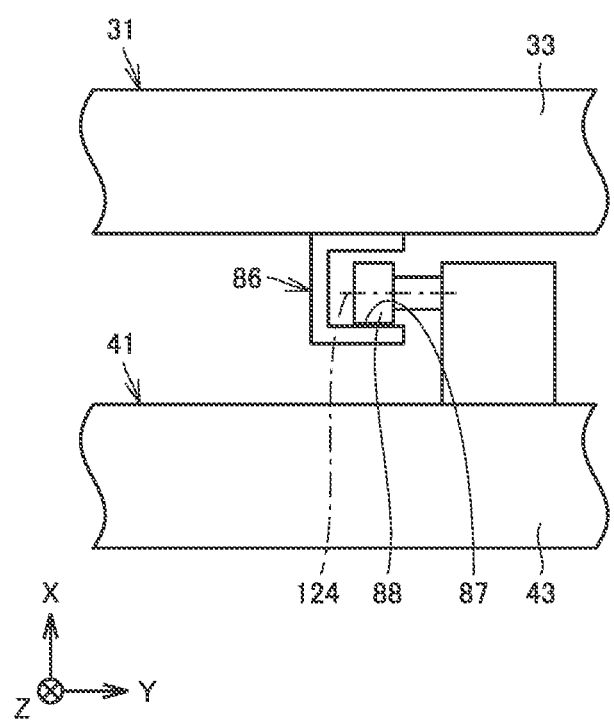
FIG. 10 is a cross section of the processing machine taken along and seen in a direction indicated by an arrow of a line X-X indicated in FIG. 3.

FIG. 10 is a cross section of the processing machine taken along and seen in a direction indicated by an arrow of a line X-X indicated in FIG. 3. Referring to FIGS. 3 and 10, processing machine 100 further comprises a rail member 86 and a traveling wheel 88.

Rail member 86 is provided at first door 31. Rail member 86 is provided at upper door portion 33. Rail member 86 has an elongate shape having a length in the Z-axis direction. Rail member 86 has a grooved portion 87. Grooved portion 87 forms a groove that opens in the +Y-axis direction and extends in the Z-axis direction.

Traveling wheel 88 is provided at second door 41. Traveling wheel 88 is provided at upper door portion 43. Traveling wheel 88 is provided at a position closer in the Z-axis direction to the end portion of second door 41 in the +Z-axis direction than the end portion of second door 41 in the −Z-axis direction. When first door 31 is in second position K and second door 41 is in third position L, traveling wheel 88 is located in first range 310 shown in FIG. 3.

Traveling wheel 88 is provided rotatably about an axis of rotation 124 extending in the Y-axis direction. Traveling wheel 88 is composed for example of a cam follower. Rail member 86 receives the weight of second door 41 via traveling wheel 88.

Grooved portion 87 engages with second door 41. More specifically, traveling wheel 88 is fitted in grooved portion 87. Second door 41 is supported slidably in the Z-axis direction by traveling wheel 88 moving along rail member 86 while rotating about axis of rotation 124.

According to this configuration, rail member 86 provided at first door 31 receives the weight of second door 41 via traveling wheel 88. This can prevent the end portion of second door 41 in the +Z-axis direction from tilting downward when first door 31 shown in FIG. 3 is in second position K and second door 41 shown in FIG. 3 is in third position L.

Figure 11:
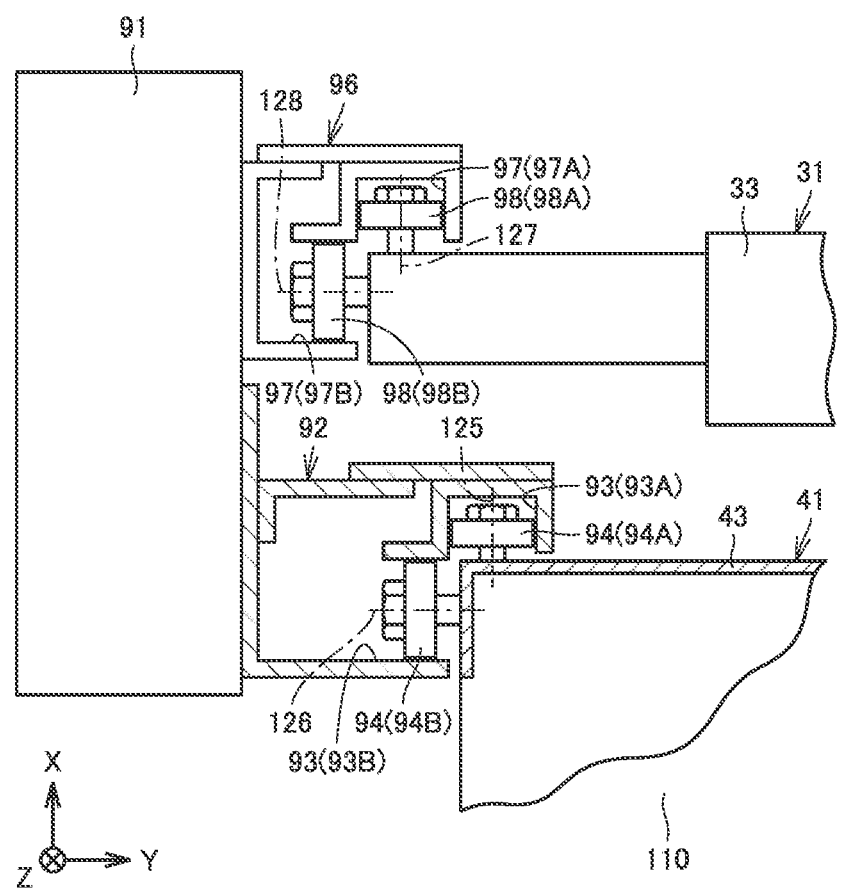
FIG. 11 is a cross section of the processing machine taken along and seen in a direction indicated by an arrow of a line XI-XI indicated in FIG. 3.

FIG. 11 is a cross section of the processing machine taken along and seen in a direction indicated by an arrow of a line XI-XI indicated in FIG. 3. Referring to FIGS. 3 and 11, processing machine 100 comprises a support member 91, a ceiling rail 92, a plurality of traveling wheels 94 (94A, 94B), a ceiling rail 96, and a plurality of traveling wheels 98 (98A, 98B).

Support member 91 is provided at a position adjacent to upper door portions 33 and 43 in the −Y-axis direction. Support member 91 is fixed to a frame member (not shown) disposed on the ceiling of processing machine 100. Ceiling rails 92 and 96 are provided on support member 91.

Ceiling rail 92 is opposite to upper door portion 43 in the Y-axis direction. Ceiling rail 96 is opposite to upper door portion 33 in the Y-axis direction. Ceiling rail 92 is provided below ceiling rail 96. Ceiling rails 92 and 96 each have an elongate shape having a length in the Z-axis direction. Ceiling rail 92 is provided in the Z-axis direction across first position J, second position K, and third position L. Ceiling rail 96 is provided in the Z-axis direction across first position J and second position K.

Ceiling rail 92 has a plurality of grooved portions 93 (93A, 93B). Grooved portion 93 forms a groove extending in the Z-axis direction. Grooved portion 93 is disposed outside processing area 110. Grooved portion 93A forms a groove that opens in the −X-axis direction and extends in the Z-axis direction. Grooved portion 93B forms a groove that opens in the +Y-axis direction and extends in the Z-axis direction. Grooved portion 93A is provided above grooved portion 93B.

Ceiling rail 96 has a plurality of grooved portions 97 (97A, 97B). Grooved portion 97 forms a groove extending in the Z-axis direction. Grooved portion 97 is disposed outside processing area 110. Grooved portion 97A forms a groove that opens in the −X-axis direction and extends in the Z-axis direction. Grooved portion 97B forms a groove that opens in the +Y-axis direction and extends in the Z-axis direction. Grooved portion 97A is provided above grooved portion 97B.

Traveling wheel 94 is provided at second door 41. Traveling wheel 94 is provided at upper door portion 43. Traveling wheel 94 is composed for example of a cam follower. Traveling wheel 94A is provided rotatably about an axis of rotation 125 extending in the X-axis direction. Traveling wheel 94B is provided rotatably about an axis of rotation 126 extending in the Y-axis direction. Traveling wheels 94A and 94B are paired and provided at two locations apart from each other in the Z-axis direction.

Traveling wheel 94 is fitted in grooved portion 93. Traveling wheel 94A is fitted in grooved portion 93A, and traveling wheel 94B is fitted in grooved portion 93B. Second door 41 is supported slidably in the Z-axis direction by traveling wheel 94A moving along grooved portion 93A while rotating about axis of rotation 125 and traveling wheel 94B moving along grooved portion 93B while rotating about axis of rotation 126.

Traveling wheel 98 is provided at first door 31. Traveling wheel 98 is provided at upper door portion 33. Traveling wheel 98 is composed for example of a cam follower. Traveling wheel 98A is provided rotatably about an axis of rotation 127 extending in the X-axis direction. Traveling wheel 98B is provided rotatably about an axis of rotation 128 extending in the Y-axis direction. Traveling wheels 98A and 98B are paired and provided at two locations apart from each other in the Z-axis direction.

Traveling wheel 98 is fitted in grooved portion 97. Traveling wheel 98A is fitted in grooved portion 97A, and traveling wheel 98B is fitted in grooved portion 97B. First door 31 is supported slidably in the Z-axis direction by traveling wheel 98A moving along grooved portion 97A while rotating about axis of rotation 127, and traveling wheel 98B moving along grooved portion 97B while rotating about axis of rotation 128.

The structure of processing machine 100 and the structure of the slide mechanism applied to processing machine 100 described above will now be summarized below. According to the present embodiment, processing machine 100 comprises: cover body 21 that is provided with opening 50 and defines processing area 110; first door 31 that is slidable in a horizontal direction as a predetermined direction between first position J in which opening 50 is opened and second position K in which opening 50 is closed; second door 41 that is disposed to overlap with first door 31 inside processing area 110 and slidable in the horizontal direction between first position J in which opening 50 is opened and third position L that is opposite to first position J with respect to second position K and in which second door 41 cooperates with first door 31 to close opening 50; and rail member 61 that includes grooved portion 62 and abutment 63 as an engagement unit that engages with first door 31, and is provided at second door 41 to allow second door 41 to slide with respect to first door 31 in the horizontal direction. Grooved portion 62 and abutment 63 are disposed outside processing area 110.

Further, according to the present embodiment, a slide mechanism applied to processing machine 100 comprises first door 31 as a base member, second door 41 as a movable body slidable in a horizontal direction as a predetermined direction, and rail member 61 that is provided at second door 41 and engages with first door 31 so that second door 41 is slidable with respect to first door 31 in the horizontal direction.

Although first door 31 and second door 41 have been described in the present embodiment as being slidable in a horizontal direction, this is not a limitation, and the first door and the second door may be slidable for example in a vertical direction.

Further, the processing machine of the present invention is not limited to a composite processing machine, and may for example be a lathe, a vertical machining center or a horizontal machining center, or may be an AM/SM hybrid processing machine capable of additively and subtractively manufacturing a workpiece.

Further, the slide mechanism of the present invention is not limited to a door of a processing machine and is applicable for example to a door of an automobile or an automatic door.

It should be understood that the embodiments disclosed herein are illustrative and non-restrictive in any respect. The scope of the present invention is defined by the terms of the claims, rather than the above description, and is intended to include any modifications within the meaning and scope equivalent to the terms of the claims.

INDUSTRIAL APPLICABILITY

The present invention is applied to a processing machine comprising an openable and closable door or a slide mechanism such as a door.

REFERENCE SIGNS LIST 21 cover body, 26 magazine cover, 27 side cover, 31 first door, 32, 42 front door portion, 33, 43 upper door portion, 34, 44 transparent window, 37, 47 inner surface, 41 second door, 45 door body portion, 46 outer surface, 48 side surface, 49 notch, 50 opening, 51 front opening, 52 upper opening, 61, 61A, 61B, 86 rail member, 62, 87, 93, 93A, 93B, 97, 97A, 97B grooved portion, 63 abutment 64, 64A, 64B first traveling wheel, 65 second traveling wheel, 66 first block, 67 frame, 68 bolt, 69 second block, 70 open end, 71 lid member, 72 lid body portion, 73 labyrinth portion, 76 labyrinth member, 80, 91 support member, 81 lower rail, 82, 83, 84, 88, 94, 94A, 94B, 98, 98A, 98B traveling wheel, 92, 96 ceiling rail, 100 processing machine, 110 processing area, 115 internal space, 121, 122, 123, 124, 125, 126, 127, 128 axis of rotation, 310 first range, 320 second range, J first position, K second position, L third position.

The invention claimed is:
1. A processing machine comprising:
a cover body that is provided with an opening and defines a processing area in which a workpiece is processed;
a first door that is slidable in a predetermined direction between a first position in which the opening is opened and a second position in which the opening is closed;
a second door that is disposed to overlap with the first door inside the first door with respect to the processing area and slidable in the predetermined direction between the first position in which the opening is opened and a third position that is opposite to the first position with respect to the second position and in which third position the second door cooperates with the first door to close the opening; and a rail member that includes an engagement unit that engages with the first door so as to guide the sliding of the first door, which rail member is provided at the second door to allow the second door to be slidable with respect to the first door in the predetermined direction, the engagement unit being disposed outside the processing area, the second door including an outer surface and an inner surface separated by an internal space formed therebetween, the second door also being provided with a notch opening to the outer surface, the outer surface being located outside the processing area and facing the first door when the first door and the second door are in the first position, the inner surface being located inside the processing area, the rail member being accommodated in the internal space, and the first door engaging with the engagement unit in the internal space via the notch.

2. The processing machine according to claim 1, wherein the rail member is provided at the second door without projecting from the outer surface toward the first door.

3. The processing machine according to claim 1, wherein the engagement unit includes an open end that is located opposite to the first door when the first door is in the second position and the second door is in the third position and that opens in one direction along the predetermined direction, and the second door further includes a door body portion provided with the rail member, and the second door includes a lid member that is attached to the door body portion and that closes an opening defined by the open end.

4. The processing machine according to claim 3, wherein the lid member includes a labyrinth portion that extends toward the first door and forms a labyrinth structure with the first door.

5. The processing machine according to claim 1, wherein the predetermined direction is a horizontal direction, the opening includes a front opening located in front, with respect to the machine, of the processing area, and an upper opening contiguous to the front opening and located above the processing area, the second door includes a front door portion and an upper door portion that close the front opening and the upper opening, respectively, when the second door is in the third position, and of the front and upper door portions, the front door portion is provided with the rail member.

6. A processing machine comprising:

a cover body that is provided with an opening and defines a processing area in which a workpiece is processed;

a first door that is slidable in a predetermined direction between a first position in which the opening is opened and a second position in which the opening is closed;

a second door that is disposed to overlap with the first door inside the first door with respect to the processing area and slidable in the predetermined direction between the first position in which the opening is opened and a third position that is opposite to the first position with respect to the second position and in which third position the second door cooperates with the first door to close the opening; and a rail member that includes an engagement unit that engages with the first door so as to guide the sliding of the first door, which rail member is provided at the second door to allow the second door to be slidable with respect to the first door in the predetermined direction, the engagement unit being disposed outside the processing area, wherein the engagement unit includes an open end that is located opposite to the first door when the first door is in the second position and the second door is in the third position and that opens in one direction along the predetermined direction, and wherein the second door further includes a door body portion provided with the rail member, and the second door includes a lid member that is attached to the door body portion and that closes an opening defined by the open end.

7. The processing machine according to claim 6, wherein the second door includes an outer surface that faces the first door when the first door and the second door are in the first position, and the rail member is provided at the second door without projecting from the outer surface toward the first door.

8. The processing machine according to claim 6, wherein the lid member includes a labyrinth portion that extends toward the first door and forms a labyrinth structure with the first door.

9. The processing machine according to claim 6, wherein the predetermined direction is a horizontal direction, the opening includes a front opening located in front, with respect to the machine, of the processing area, and an upper opening contiguous to the front opening and located above the processing area, the second door includes a front door portion and an upper door portion that close the front opening and the upper opening, respectively, when the second door is in the third position, and of the front and upper door portions, the front door portion is provided with the rail member.

* * * * *

UNITED STATES PATENT AND TRADEMARK OFFICE
CERTIFICATE OF CORRECTION

Page 1 of 1

PATENT NO. : 12,415,243 B2
APPLICATION NO. : 17/924733
DATED : September 16, 2025
INVENTOR(S) : Tatsuhiro Nakanishi, Futoshi Yamazaki and Tatsuhiko Kuriya It is certified that error appears in the above-identified patent and that said Letters Patent is hereby corrected as shown below:

On the Title Page

Insert item (73) as -- DMG MORI CO., LTD., Nara (JP) --

Signed and Sealed this
Third Day of February, 2026

John A. Squires
*Director of the United States Patent and Trademark Office*